United States Patent [19]

Carter

[11] Patent Number: 5,004,373
[45] Date of Patent: Apr. 2, 1991

[54] METHOD FOR INITIATING IN-SITU VITRIFICATION USING AN IMPREGNATED CORD

[75] Inventor: John G. Carter, Richland, Wash.

[73] Assignee: Battelle Memorial Institute, Richland, Wash.

[21] Appl. No.: 282,120

[22] Filed: Dec. 8, 1988

[51] Int. Cl.⁵ .......................... E02D 3/11; G21F 9/16
[52] U.S. Cl. .................................. 405/131; 405/128; 405/258; 252/629; 338/214; 299/14; 501/32
[58] Field of Search ............. 405/128, 129, 131, 258; 175/16; 299/14; 338/214; 501/32; 252/629

[56] References Cited

U.S. PATENT DOCUMENTS

| | | | |
|---|---|---|---|
| 3,991,379 | 11/1976 | King | 338/214 |
| 4,244,722 | 1/1981 | Tsuya et al. | 65/325 |
| 4,376,598 | 3/1983 | Brauns et al. | 405/258 |
| 4,514,329 | 4/1985 | Wakabayashi et al. | 501/12 X |
| 4,670,634 | 6/1987 | Bridges et al. | 405/131 |
| 4,759,879 | 7/1988 | Cadoff et al. | 252/629 |
| 4,762,991 | 8/1988 | Timmerman et al. | 405/128 X |

FOREIGN PATENT DOCUMENTS 609386 11/1965 Italy ................................. 405/131

Primary Examiner—Dennis L. Taylor
Assistant Examiner—Arlen L. Olsen
Attorney, Agent, or Firm—Dellett, Smith-Hill and Bedell

[57] ABSTRACT

In-situ vitrification of soil is initiated by placing a cord of dielectric material impregnated with conductive material in thermally-conductive contact with the soil, and energizing the cord with an electric current for heating the cord and starting the vitrification process.

13 Claims, 1 Drawing Sheet

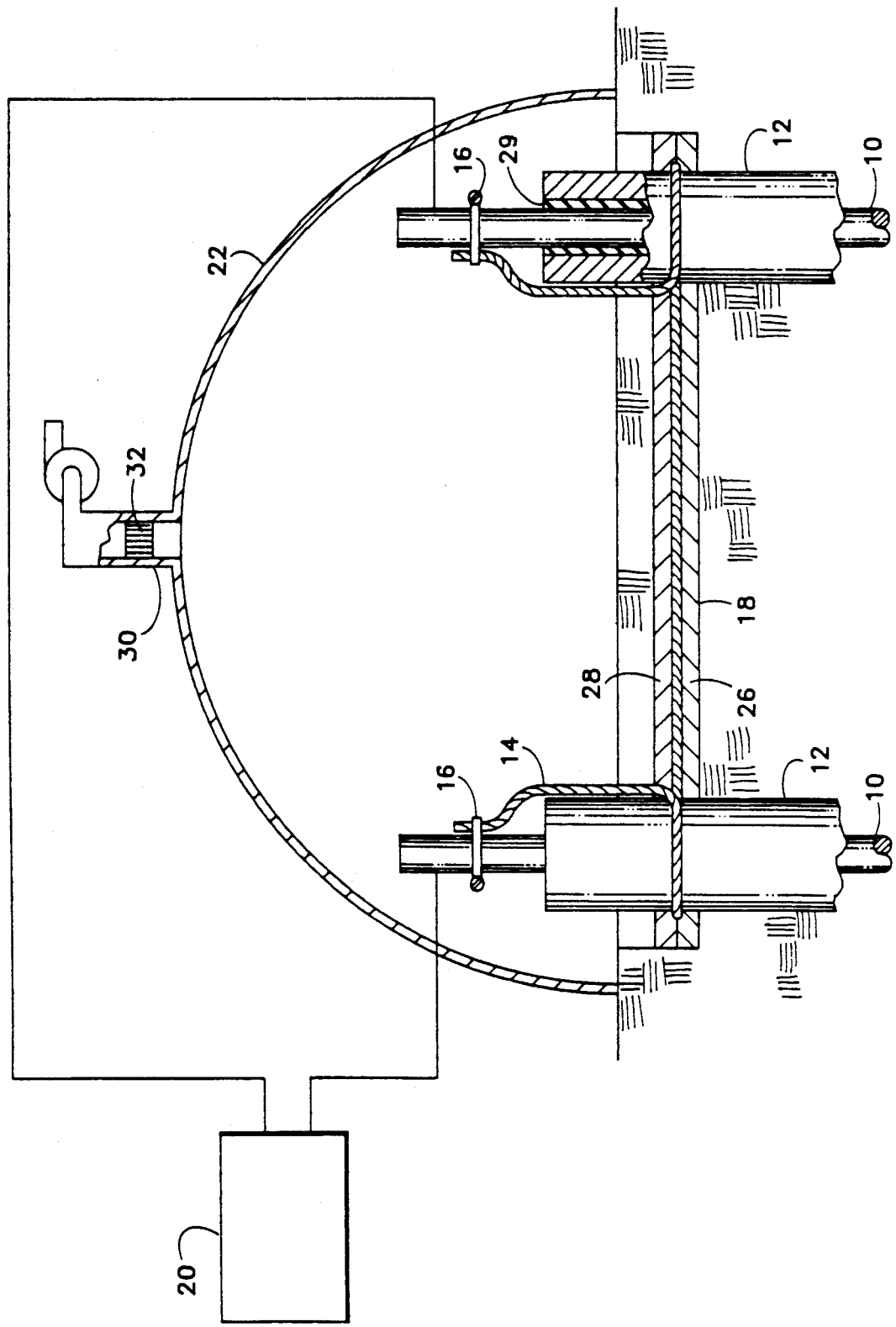

METHOD FOR INITIATING IN-SITU VITRIFICATION USING AN IMPREGNATED CORD

The U. S. Government has a paid-up license in this invention and the right in limited circumstances to require the patent owner to license others on reasonable terms as provided for by the terms of Contract No.: DE-AC06-76RLO 1830 awarded by the U. S. Department of Energy.

BACKGROUND OF THE INVENTION

This invention relates to in-situ vitrification of soil and particularly to a process for initiating in-situ vitrification.

The process of vitrifying soil, turning soil into a solid glassy substance, is accomplished as described by Brouns et al Patent No. 4,376,598 entitled "In-Situ Vitrification of Soil", by placing two electrodes in the soil and passing a substantial electric current through the electrodes and heating the soil until it melts. As the soil melts, it better conducts electricity thereby creating more heat and melting additional soil. When a sufficient volume of the soil reaches a molten state, the process is stopped and the soil is allowed to solidify. If gaseous by-products are released in the vitrification process, a dome with a filtering system can be positioned above the soil surface for containing and treating the gases. This process of soil vitrification is mainly used as an effective and cost efficient means for containing or stabilizing contaminated soil since turning the soil into a solid glasslike substance prevents chemical or radioactive contaminates from leaching out of the soil and contaminating the surrounding biosphere.

Soil in its solid state is a very poor conductor of electricity such that a start up procedure must be included in the process in order to initiate current flow. Once the heat generated by the current flow begins to melt the soil, the soil itself becomes a good conductor of electricity and perpetuates the melting process.

One prior art method of initiating the vitrification process involves placing a layer of graphite filings between the electrodes. In another method, a metal resistance coil is attached between the electrodes, and in yet a third method a chemical agent is employed to create a conductive path between the electrodes.

Each of the prior methods of initiating the vitrification process is subject to disadvantage. For example, when a layer of graphite filings is placed between the electrodes, a substantial amount of particulate matter is generated during initiation of the vitrification process. It is desirable to minimize the amount of particulate matter released during the vitrification process because the particles tend to clog the filter used in the gas treatment process thereby limiting the filter's effectiveness and decreasing its longevity. Additionally, unless a large quantity of graphite is used, the filing path is an unreliable electrical circuit providing inconsistent resistance and heat production which can cause arcing and electrical equipment failure. A need therefore exists for a start-up method that will provide a reliable electrical path with consistent resistance and temperature properties while not generating excessive particulate matter.

SUMMARY OF THE INVENTION

A preferred embodiment of the invention in a first aspect is a method for initiating the in-situ vitrification of soil, comprising the steps of placing a cord of dielectric material impregnated with conductive material in thermally-conductive contact with the soil, and energizing the cord with an electric current for heating the cord and starting the vitrification process.

Preferably, the cord is made of glass fiber and is impregnated with graphite. A glass fiber cord impregnated with graphite provides a reliable electric path with superior thermal properties and avoids generation of a substantial amount of particulate matter.

It is accordingly an object of the present invention to provide a superior method for initiating in-situ vitrification.

It is another object of the present invention to provide a reliable electric path with superior thermal properties between the electrodes that are employed in an in-situ vitrification process.

It is another object of the present invention to provide an improved method for initiating in-situ vitrification such that substantial particulate matter is not generated.

BRIEF DESCRIPTION OF THE DRAWING

For a better understanding of the invention, and to show how the same may be carried into effect, reference will now be made, by way of example, to the accompanying drawing, the single figure of which illustrates an apparatus for in-situ vitrification.

DETAILED DESCRIPTION OF THE INVENTION

The drawing illustrates an apparatus for in-situ vitrification which employs two electrode sleeves 12 placed upright in the soil some distance apart with two electrodes 10 inserted into respective sleeves 12. Each sleeve 12 extends downwards from the soil surface to at least the depth to which melting is to occur. The electrode projects from the sleeve at its top and bottom. The conductive sleeve is formed of a material that has a higher thermal conductivity than exhibited by the electrode, while the electrode is more resistant to oxidation than the sleeve. The annular space formed between the sleeve 12 and electrode 10 is suitably filled with a conducting substance 29 which becomes sintered onto the electrode as the sleeve is consumed by oxidation above the level of the molten soil surface.

A trench 18 is excavated around each electrode and between the two electrodes and is lined with a layer 26 of glass frit material. A glass fiber cord 14, impregnated with graphite, is attached at its ends to the electrodes 10 respectively by means of hose clamps 16, and is placed in the trench. The cord 14 is then covered with a second layer 28 of glass frit material. Soil may be used to cover the glass fiber cord 14 and frit material in the trench and in the area around the electrodes.

Power supply 20 is coupled to the electrodes 10, and when the power supply is energized, a current passes through the electrodes and the graphite in the cord raising the temperature to a level that melts the frit material. When the frit material melts, typically about 900° C., its resistance decreases and therefore the electrical current increases, causing the temperature to rise to the point (e.g. about 1500° C.) at which the soil is converted to a molten state. The temperature may eventually rise to the point (e.g. 2000° C.) at which the cord melts. When the desired volume of soil is converted to a molten state, the power supply can be de-energized and the soil is allowed to solidify into a glasslike substance.

The vitrification apparatus includes a dome 22, which encloses the electrodes and soil being vitrified. Gaseous by-products resulting from the vitrification process are exhausted from the dome 22 through a conduit 30 provided with a filter 32 for trapping particulate material. The glass fiber cord provides a reliable and controllable electric path thereby reducing the quantity of particulates generated during initiation of the vitrification process. Therefore the longevity and effectiveness of the filter 32 is increased as compared with the filters used in conjunction with prior methods of initiating vitrification, involving generation of a large quantity of particulates.

In a preferred embodiment, the sleeves 12 are composed of solid graphite, the electrodes 10 of molybdenum and the conducting substance 29 is a conductive ceramic powder. The ceramic powder suitably comprises a mixture of approximately 12% molybdenum disilicide and 88% zirconium diboride. This material is selected because of its oxidation resistance and electrical conductivity properties and because it sinters onto the molybdenum electrode forming a protective coating for resisting oxidation.

The graphite sleeves 12 in conjunction with the glass fiber cord 14 provide high thermal conductivity necessary to melt the soil. During the vitrification process, the graphite sleeves 12 are consumed by oxidation above the level of the molten soil surface but otherwise remain substantially intact. Molybdenum is more resistant to oxidation than graphite and therefore is not consumed so rapidly as are the graphite sleeves. Also, a layer of molten soil adheres to the molybdenum electrode 10, further protecting it from oxidation. The ceramic powder 29 maintains electrical continuity between the sleeve 12 and the electrode 10 and protects the molybdenum electrode from oxidation if the graphite sleeve is totally consumed above the molten surface. Large molybdenum electrodes may be used instead of smaller rods and graphite sleeves but are unfeasible due to the high economic costs. Moreover, negative results occur when molybdenum electrodes come in direct contact with the soil. Molybdenum electrodes do not promote "subsidence" of the soil as graphite electrodes do, but rather tend toward causing the formation of a "cold cap", i.e., bringing porous vitrified soil to the surface of the soil or even above the original soil surface. This problem is averted by employing the graphite sleeves.

As previously mentioned, the glass fiber cord 14 is impregnated with graphite. Graphite provides the high electrical conductivity of a metal needed to produce the heat necessary to melt the glass frit and initiate the vitrification process. The glass fiber cord binds the graphite into a reliable electrical path. The melting point of the glass fiber cord is about 2000° C. as compared to the 900° C. melting point of the glass frit 26, 28. This property ensures that the electrical path will be maintained until after the glass frit is melted and the vitrification process initiated.

Impregnating the glass fiber cord with the graphite reduces the quantity of graphite required to initiate vitrification and diminishes the amount of particulate matter expelled in the vitrification process. The cord may be impregnated by placing a length of glass fiber cord, for example having a diameter of 1.3 cm, in a container and pouring a water-based graphite lubricant, diluted in water at a 1 to 1 ratio by volume, over the glass fiber cord in the container and allowing the cord to soak until it is completely impregnated. The fine graphite particles of the lubricant enter the spaces in the weave of the glass fiber cord. Upon removing the cord from the container, the excess lubricant is removed and a thin layer of pure graphite flake is suitably applied to the outer surface of the impregnated cord. The impregnated cord is then placed approximately 15.3 cm below the surface of the soil in a trench lined with 2.5 cm of glass frit material between the two electrodes. A second layer of glass frit material is placed over the cord and is covered with soil. Current flow is initiated by applying a voltage between the electrodes and an electrical linear power density of 100 Watts per foot is suitably employed to initiate the drying of the impregnated cord. The power density is increased at a predetermined rate which is low enough not to disintegrate the cord. The current passing through the graphite in the cord generates heat that melts the glass frit material, increasing the electrical current and causing higher temperatures until the glass cord and the soil are converted to a molten state.

The glass fiber cord impregnated with graphite acts as a superior initiator in the soil vitrification process because it provides a more reliable and consistent electrical path between the electrodes and, as hereinbefore mentioned, does not result in generation of a substantial quantity of particulate matter. Furthermore, the layer of soil that covers the cord inhibits the release of particulate material.

It will be appreciated that the present invention is not restricted to the particular embodiment that has been described, and that changes may be made therein without departing from the scope of the invention as defined in the appended claims and equivalents thereof.

I claim:

1. A method for initiating the in-situ vitrification of soil, comprising the following steps:
   impregnating a cord composed of dielectric fibers with a conductive material in finely divided form, whereby the conductive material enters interstices among the fibers of the cord,
   positioning the cord so that it is in thermally-conductive contact with the soil and connecting the cord between a pair of electrode that extend into the soil, and energizing the cord with an electric current for heating the cord and starting the vitrification process.

2. A method for initiating the in-situ vitrification of soil, comprising the following steps:
   (a) immersing a glass fiber cord in a graphite suspension, whereby particles of graphite enter interstices among the fibers of the cord,
   (b) positioning the cord so that it is in thermally-conductive contact with the soil and connecting the cord between a pair of electrodes that extend into the soil, and
   (c) energizing the cord with an electric current for heating the cord and starting the vitrification process.

3. A method in accordance with claim 2 further comprising the following step between steps (a) and (b):
   applying graphite flakes to the cord.

4. A method in accordance with claim 3, further comprising the following steps between steps (a) and (c):

placing the cord in a trench, and covering the cord with glass frit material.

5. A method in accordance with claim 4, wherein the glass frit material is applied in a layer of which the upper surface is below the surface of the soil, and the method further comprises covering the layer of glass frit material with soil.

6. A method for initiating the in-situ vitrification of soil, comprising the following steps:

placing a cord of dielectric material impregnated with conductive material in thermally-conductive contact with the soil, and energizing the cord with an electric current for heating the cord and starting the vitrification process.

7. A method according to claim 6, wherein the dielectric material is glass fiber and the conductive material is finely divided graphite in interstices among the fibers of the cord.

8. A method in accordance with claim 6, comprising forming a trench in the soil, placing glass frit material in the trench, and placing the cord in the trench.

9. A method according to claim 8, wherein the glass frit material has a lower melting point than the soil.

10. A method in accordance with claim 6, comprising forming a trench in the soil, placing the cord in the trench and placing glass frit material in the trench.

11. A method according to claim 10, wherein the glass frit has a lower melting point than the soil.

12. An apparatus for performing in-situ vitrification of soil comprising:

at least two conductive electrodes, means for initiating the vitrification of the soil, said means comprising at least one dielectric cord impregnated with conductive material and attached between said conductive electrodes, and means for energizing said electrodes and said impregnated cord with an electric current.

13. A method for initiating the in-situ vitrification of soil, comprising the following steps:

providing a cord of refractory fibers, impregnating the cord with conductive material in finely divided form, whereby particles of conductive material enter interstices among the fibers, so that the resistance of the impregnated cord is substantially less than the resistance of the cord alone, positioning the impregnated cord so that it is in thermally-conductive contact with the soil and connecting the cord between a pair of electrodes that extend into the soil, and energizing the impregnated cord with an electric current for heating the cord and starting the vitrification process.

* * * * *